United States Patent
Stanfel et al.

(10) Patent No.: US 8,747,668 B2
(45) Date of Patent: Jun. 10, 2014

(54) SEPARATION MEDIA FOR SEPARATING WATER-HYDROCARBON EMULSIONS HAVING LOW INTERFACIAL TENSIONS

(75) Inventors: Christine M. Stanfel, Owensboro, KY (US); Farina Diani Pangestu, Madisonville, KY (US)

(73) Assignee: Ahlstrom Corporation, Helsinki (FI)

( * ) Notice: Subject to any disclaimer, the term of this patent is extended or adjusted under 35 U.S.C. 154(b) by 0 days.

(21) Appl. No.: 13/445,707

(22) Filed: Apr. 12, 2012

(65) Prior Publication Data

US 2012/0261358 A1 Oct. 18, 2012

Related U.S. Application Data

(63) Continuation of application No. 12/576,839, filed on Oct. 9, 2009, now abandoned.

(51) Int. Cl.
*B01D 39/18* (2006.01)

(52) U.S. Cl.
USPC ........... 210/314; 210/489; 210/505; 210/508; 210/DIG. 5

(58) Field of Classification Search
USPC ......... 210/314–317, 335, 488–492, 506–509, 210/689, 799, 804, DIG. 5, 505
See application file for complete search history.

(56) References Cited

U.S. PATENT DOCUMENTS

| 3,228,527 A | 1/1966 | McPherson |
| 4,168,229 A | 9/1979 | Chambers |
| 6,422,396 B1 | 7/2002 | Li et al. |

FOREIGN PATENT DOCUMENTS

| EP | 1 726 347 A1 | 11/2006 |
| GB | 1 395 399 | 5/1975 |
| GB | 2 316 016 A | 2/1998 |
| WO | 98/14257 | 4/1998 |
| WO | 2009/018463 | 2/2009 |

OTHER PUBLICATIONS

Stanfel, *Fuel Filtration: Protecting the diesel engine*, Filtration-Separation, May/Jun. 2009.
U.S. Appl. No. 12/014,864, filed Jan. 16, 2008.

*Primary Examiner* — Matthew O Savage
(74) *Attorney, Agent, or Firm* — Nixon & Vanderhye P.C.

(57) ABSTRACT

Separation media, separation modules and methods are provided for separating water from a water and hydrocarbon emulsion and include a fibrous nonwoven coalescence layer for receiving the water and hydrocarbon emulsion and coalescing the water present therein as a discontinuous phase to achieve coalesced water droplets having a size of 1 mm or greater, and a fibrous nonwoven drop retention layer downstream of the coalescence layer having a high BET surface area of at least 90 $m^2/g$ or greater sufficient to retain the size of the coalesced water droplets to allow separation thereof from the hydrocarbon.

10 Claims, 2 Drawing Sheets

Figure 1:
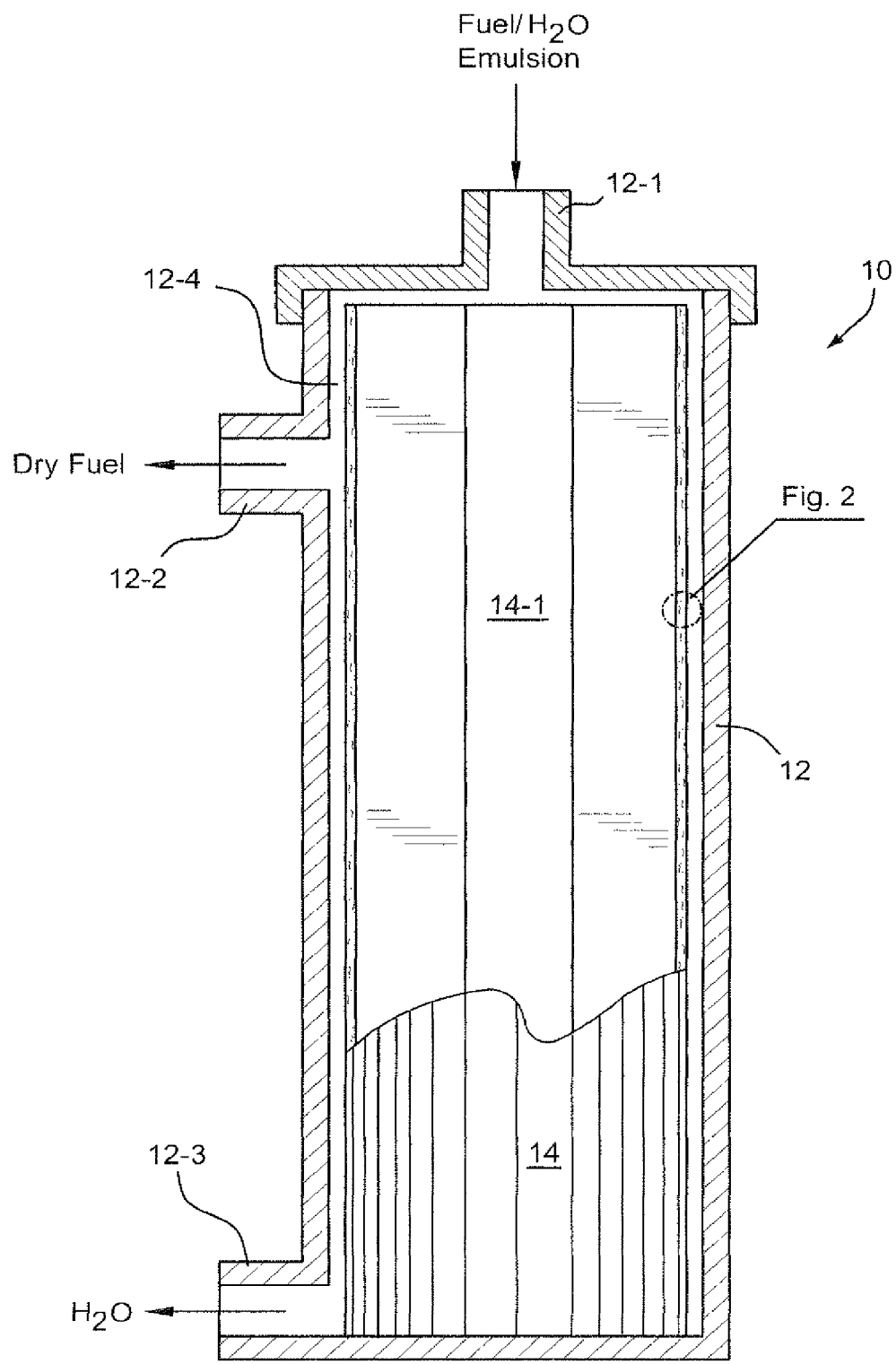

SEPARATION MEDIA FOR SEPARATING WATER-HYDROCARBON EMULSIONS HAVING LOW INTERFACIAL TENSIONS

CROSS-REFERENCE

This application is a continuation of commonly owned U.S. application Ser. No. 12/576,839, filed 9 Oct. 2009, now abandoned, the entire contents of which is hereby incorporated by reference.

FIELD

The embodiments disclosed herein relate generally to separation media and methods for separating water-hydrocarbon emulsions. In especially preferred forms, the embodiments disclosed herein relate to separation of water from a water-hydrocarbon fuel (e.g., diesel fuel) emulsion.

BACKGROUND

The need to separate emulsions of water and hydrocarbons is ubiquitous; historically impacting a broad array of industries. The separation of water-hydrocarbon emulsions has conventionally involved systems that rely on single or multiple elements, novel flow patterns, stilling chambers, parallel metallic plates, oriented yarns, gas intrusion mechanisms, and electrostatic charge. The balance of separation systems employ an element that contains a fibrous, porous coalescing media through which the emulsion is passed and separated. Irrespective of the system design, all water-hydrocarbon separation systems target the collection of emulsified drops into close proximity to facilitate coalescence. Coalescence and subsequent separation due to density differences between water and hydrocarbons is the mechanism behind all separation systems.

Conventionally known fibrous, porous coalescence media induce emulsion separation in flow-through applications through the same general mechanism, irrespective of the nature of the emulsion. The coalescence media presents to the discontinuous phase of the emulsion an energetically dissimilar surface from the continuous phase. As such, the media surface serves to compete with the continuous phase of the emulsion for the discontinuous, or droplet, phase of the emulsion. As the emulsion comes in contact with and progresses through the coalescing media, droplets partition between the solid surface and the continuous phase. Droplets adsorbed onto the solid media surface travel along fiber surfaces, and in some cases, wet the fiber surface. As more emulsion flows through the media, the adsorbed discontinuous phase encounters other media-associated droplets and the two coalesce. The drop migration-coalescence process continues as the emulsion moves through the media.

A coalescence media is therefore typically considered to be functionally successful for breaking a given emulsion if the discontinuous phase preferentially adsorbs or is repelled and if the droplet phase has been coalesced into drops at the point of exit from the media that are sufficiently large to allow their separation from the continuous phase. Typically, the drops separate from the continuous phase as a function of density differences between the liquids involved. Conversely, a coalescence media is considered to be functionally unsuccessful for breaking an emulsion if the drops remain sufficiently small at the point of exit from the media that they remain entrained by the continuous phase and fail to separate.

Conventional fibrous, porous coalescence media are known which effectively remove over 90 wt. % of emulsified water from a hydrocarbon, when the hydrocarbon has an interfacial tension (γ) above 25 dynes/cm with water. If the hydrocarbon displays hydrocarbon-water interfacial tension below 25 dynes/cm (colloquially known as "sub-25 interfacial tension hydrocarbons"), the water-hydrocarbon emulsion is considerably more tenacious and the ability of prior art emulsion separation media to remove emulsified water diminishes dramatically to the point where 40-100 wt. % of emulsified water is allowed to pass into the end use without removal.

A decrease in hydrocarbon interfacial tension occurs when the hydrocarbon is dosed with surfactants. In this regard, one root cause of prior art fibrous, porous coalescence media failure in sub-25 interfacial tension hydrocarbons is the presence of increased surfactancy. In cases of sub-25 interfacial tension hydrocarbons, emulsion separation requires more complex systems that often involve nested pleated elements, flow path controllers, wraps, and stilling chambers. The prior art is replete with examples of complex systems designed to manage difficult to separate water-hydrocarbon emulsions. Therefore the need for a universal media capable of emulsion separation irrespective of hydrocarbon-water interfacial tension or surfactant content is clear in the face of such complexity.

The role of surfactant-deactivation of conventional fibrous, porous coalescence media includes drop size, drop stability, and surfaces. Surfactants are molecules that contain both hydrophilic and hydrophobic moieties. When present in a hydrocarbon-water mixture, surfactants align at interfaces with the hydrophilic head group associated with the water-like phase, and the hydrophobic tail extended into the oil-like phase. This is the lowest energy conformation of the surfactant, and it results in depressed hydrocarbon-water interfacial tension. As a result of depressed interfacial tension, a given increment of input energy to the hydrocarbon-water mixture will result in a higher interface surface area in the presence of a surfactant. Interface surface area is inversely proportional to discontinuous phase drop size. Thus, in the presence of surfactant, a given increment of input energy will result in a smaller drop size distribution of discontinuous phase than in the absence of surfactant. In this regard, all fuel-water separation media rely on physical interaction between water drops and the media to effect separation. Surfactants create sufficiently small water drops that many pass through the media without encountering it. Surfactants also stabilize the emulsion from separation so that drops that do impact the media are less likely to partition out of the fuel onto the media. Similarly, drops that impact other drops resist coalescing into the larger drops necessary for successful separation. Finally, surfactants associate with surfaces of media and water drops, and interfere with the unique surface interactions between media and water that destabilize water within the fuel and allow its separation. Collectively, the result of blending surfactants into a hydrocarbon is deactivation of the prior art fibrous, porous coalescence media and escape of water into the end use.

The need for a fibrous, porous coalescence media that removes water independent of hydrocarbon interfacial tension has become substantially more pronounced with mandated changes in diesel fuel quality. In the 2007 Heavy Duty Highway Diesel Rule, the EPA mandated respective reductions of particulate (PM2.5) and nitrogen oxide (NOx) emissions of 90% and 92%, with NOx allowances to drop an additional 3% in 2010. At the time of the mandate release, sulfur sensitive exhaust after-treatment was considered necessary to meet 2007 emission goals. As a result, the 2007 Highway Rule also requires sulfur levels in diesel fuel to drop 97% to 15 ppm. The resulting ultra low sulfur diesel fuel (ULSD) has been stripped of its native lubricity and requires surfactant addition to meet engine wear control requirements. ULSD consistently manifests sub-25 interfacial tension hydrocarbons with water. EPA mandated diesel fuel requirements will cascade into off-road diesel, rail, and marine fuels as part of the EPA's tiered approach to emission control, indicating all non-gasoline transportation and power generation fuels will converge over time at sub-25 dynes/cm interfacial tension.

In addition, various governmental regulatory agencies in the United States have begun providing incentives for or simply mandating minimum biodiesel blend components for commercial transportation fuels. Biodiesel is a blend of fatty acid methyl esters derived from caustic catalyzed methanol esterification of plant and animal triglycerides. Biodiesel is a surfactant, and fuel blends containing as little as 2% biodiesel have interfacial tensions well below 25 dynes/cm. As a result, the fuel pool available for non-gasoline transportation and power generation is rapidly transitioning to an interfacial tension region where prior art fuel-water emulsion separation media fail to remove water from the hydrocarbon.

Despite shifts in fuel interfacial tension, water remains a fuel contaminant of concern for corrosion of steel engine components and promotion of microbiological growth. All non-gasoline engines have fuel-water separation capability mounted in the fuel system. Further, engine emission compliance with the EPA 2007 Highway Rule depends heavily upon high pressure fuel injection equipment that is extremely sensitive to water. This makes fuel dewatering of higher importance for systems designed to meet the 2007 EPA emission mandates that spawned systemic change in fuel quality. Fuel mileage and operator interface requirements for engines dictate the need for small, light, and easy to operate water separation systems. These needs often preclude the complex separation systems that are conventionally known. As a result, mandated changes in fuel quality have created a well defined need for a fibrous, porous coalescence media that removes water independent of hydrocarbon interfacial tension.

Examples of novel coalescence media are described in commonly-owned, co-pending U.S. patent application Ser. No. 12/014,864 filed on Jan. 16, 2008 and entitled "Coalescence Media for Separation of Water-Hydrocarbon Emulsions" (the entire content of which is expressly incorporated hereinto by reference and will be referenced below as "the US '864 application"). These media achieve high surface area with needed pore structure and permeability and effectively separate tenacious emulsions of water and surfactant-containing hydrocarbons such as biodiesel-ULSD blends without use of complex separation systems. Media of the prior art often require multiple layers to affect the single function of separation of water-hydrocarbon emulsions, without guarantee of successful separation in high surfactant content, low interfacial tension hydrocarbons. In contrast, the media described in U.S. patent application Ser. No. 12/014,864 is formed as single dry layer from a wet-laid process using a homogenously distributed, wet-laid furnish including cellulose or cellulosic fibers, synthetic fibers, high-surface-area fibrillated fibers, glass microfiber, and a surface-area-enhancing synthetic material, which successfully performs the single function of water separation with a single layer of filtration media in low interfacial tension hydrocarbons.

It is typical for any fibrous, porous coalescence media to be part of a multi-layered media structure where some of the layers perform functions other than emulsion separation. In such cases, the layers may or may not be laminated together. Reasons to employ multiple layers can be due to media integrity concerns and/or filtration needs. Relative to media integrity, multiple layers are used to support the fibrous, porous coalescence media or the composite structure, to protect the fibrous, porous coalescence media from high speed rotary pleaters, and to protect the end use from possible migration of fibers from other media layers. Relative to filtration needs, multiple layers are used to add filtration capabilities such as particle removal, dirt holding, or impurity adsorption to coalescing performance. Impurities may consist of asphaltenes, organic moieties, salts, ions, or metals. In order to meet filtration goals as well as to protect media integrity, a layer on the downstream side of the coalescing media in a multi-functional filtration media is required.

Incorporation of a coalescing media into a multi-layered, multi-functional coalescing media structure with a layer on the downstream side of the coalescing layer creates the possibility of media failure in high surfactant (i.e., sub-25 interfacial tension) hydrocarbons due to re-emulsification of the previously coalesced drops. In this regard, coalesced water drops must be large enough to settle out of the hydrocarbon flow by virtue of density differences otherwise they will be carried out of the separating device with the dried hydrocarbon and re-emulsified therein. Coalescing media must therefore function to enlarge micron sized droplets of water found in high surfactant content water-hydrocarbon emulsions into millimeter sized coalesced water drops which can gravimetrically settle out of the dry hydrocarbon flow.

For the reasons noted above, in high surfactant content hydrocarbons, the performance of any coalescing layer in a multi-layered media can be dramatically reduced by media that is conventionally used on the downstream side of the coalescing layer. Specifically, conventional media situated on the downstream side of a coalescing layer include phenolic resin saturated cellulose wet laid media, polyester meltblown, spunbond, and meltblown-spunbond composites, and nylon spunbond. Such conventional media can and does dramatically reduce the coalescing function of the coalescence media in high surfactant-containing hydrocarbons. By way of example, the performance reduction that can be manifested through use of such conventional media downstream of a coalescing layer can be between about 50 to 100% of emulsified water remaining in the hydrocarbon and thereby being passed on to the hydrocarbon's end use due to reduction in droplet size of the previously coalesced water droplets.

It would therefore be desirable if new media options to serve as layers placed on the downstream side of a coalescing media could be provided that perform requisite support and protection functions as well as display sufficiently high surface area for water adsorption to minimize re-emulsification. In this regard, it would be especially desirable if a media serving as a layer downstream of a coalescing layer perform not only its traditional support and protection roles, but also provide for a higher surface area for water adsorption than the coalescing layer. Such a downstream layer would serve to expand the flow path available to water, and accordingly would induce the Venturi effect and reduce the water velocity relative to the hydrocarbon. Such a velocity reduction would in turn increase the water pressure within the downstream layer, thus forcing hydrocarbon out of the layer. These factors would serve to further separate water from hydrocarbon and thus facilitate further coalescence of the water. This is highly desirable for separation applications involving surfactant-containing hydrocarbons. It is therefore additionally desirable to develop media capable of providing support and protection functions demanded of media placed on the downstream side of a coalescing layer in a multi-layer coalescing media that provide higher surface area for water adsorption than available within the coalescing layer.

It is towards fulfilling such desirable attributes that the present invention is directed.

SUMMARY OF EXEMPLARY EMBODIMENTS

According to one aspect, the embodiments disclosed herein provide for separation media for separating water from a water and hydrocarbon emulsion comprising a fibrous nonwoven coalescence layer for receiving the water and hydrocarbon emulsion and coalescing the water present therein as a discontinuous phase to achieve coalesced water droplets having a size of 1 mm or greater, and a fibrous nonwoven drop retention layer downstream of the coalescence layer having a high BET surface area of at least 90 $m^2/g$ or greater sufficient to retain the size of the coalesced water droplets to allow separation thereof from the hydrocarbon.

In certain preferred forms, the drop retention layer of the separation media will have a high BET surface area of at least 95 $m^2/g$, more preferably at least 100 $m^2/g$, or greater.

The drop retention layer may comprise a mixture of fibers having a high BET surface area and fibers having a low BET surface area and/or may comprise a resin binder. If a resin binder is provided, it most preferably includes a polar chemical group.

According to certain embodiments, the separation media may comprise at least one additional layer positioned between the coalescence and drop retention layers. For example, at least one additional layer may be positioned upstream and/or downstream of the drop retention layer to provide the separation media with desired physical properties.

Modules for separating water from a water and hydrocarbon emulsion may be provided having a housing provided with an inlet for the emulsion and respective outlets for water and dewatered hydrocarbon, the housing being provided with a separation media therein. The separation media provided in the housing preferably comprises a fibrous nonwoven coalescence layer for receiving the water and hydrocarbon emulsion and coalescing the water present therein as a discontinuous phase to achieve coalesced water droplets having a size of 1 mm or greater, and a fibrous nonwoven drop retention layer downstream of the coalescence layer having a high BET surface area of at least 90 $m^2/g$ or greater sufficient to retain the size of the coalesced water droplets to allow separation thereof from the hydrocarbon.

According to yet another aspect, the embodiments disclosed herein provide for methods to separate water from a water and hydrocarbon emulsion by passing a water and hydrocarbon emulsion through a fibrous nonwoven coalescence layer so as to coalesce the water present therein as a discontinuous phase to achieve coalesced water droplets having a size of 1 mm or greater, and then passing the hydrocarbon and coalesced water droplets though a downstream droplet retention layer having a high BET surface area of at least 90 $m^2/g$ or greater sufficient to retain the size of the coalesced water droplets. The coalesced water droplets may then be separated from the hydrocarbon (e.g., by the density differences therebetween). Preferably at least 90 wt. % of the water in the emulsion is coalesced into water droplets having a size of 1 mm or greater by the coalescence layer.

In preferred embodiments, the hydrocarbon has an interfacial tension ($\gamma$) of less than 25 dynes/cm (i.e., a sub-25 hydrocarbon). The hydrocarbon may thus be a liquid fuel (e.g., a biodiesel fuel) which comprises a surfactant.

BRIEF DESCRIPTION OF ACCOMPANYING DRAWINGS

Figure 2:
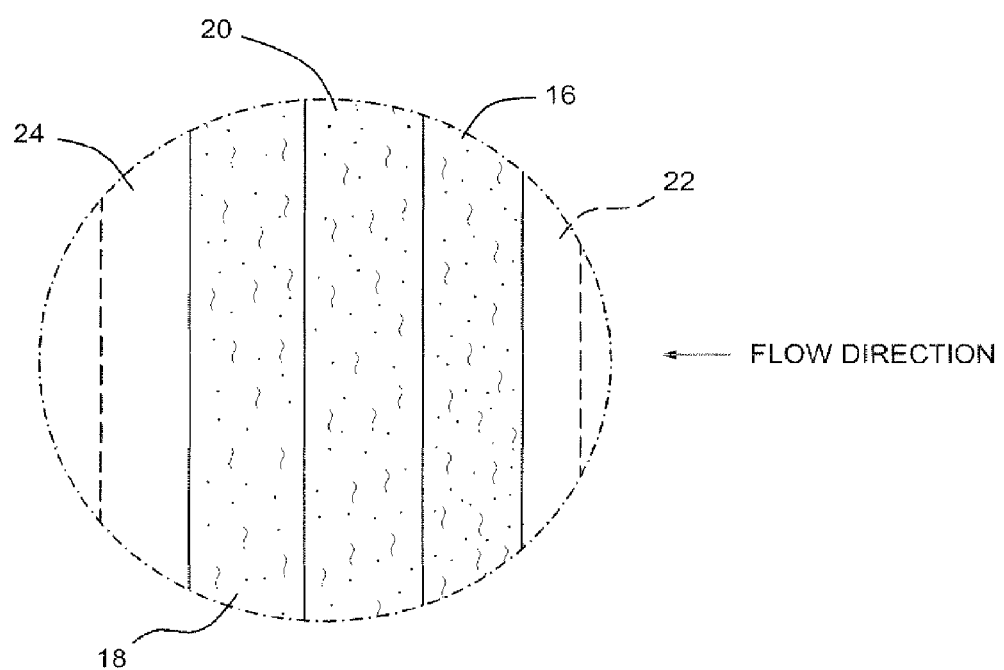

These and other features and advantages will be better and more completely understood by referring to the following detailed description of exemplary non-limiting illustrative embodiments in conjunction with the drawings of which:

FIG. 1 is a schematic cross-sectional view of a water-hydrocarbon separation system that embodies the separation media of the present invention; and FIG. 2 is an enlarged schematic cross-sectional view of an exemplary embodiment of the separation media according to the present invention as taken along line 2-2 in FIG. 1.

DEFINITIONS

As used herein and in the accompanying claims, the terms below are intended to have the definitions as follows.

A "water-hydrocarbon emulsion" is an emulsified mixture of immiscible water and hydrocarbon liquids.

"Fiber" means a fibrous or filamentary strand of extreme or indefinite length.

"Staple fiber" means a fiber which has been cut to definite, relatively short, segments of predetermined individual lengths.

"Fibrous" means a material that is composed predominantly of fiber and/or staple fiber.

"Non-woven" means a collection of fibers and/or staple fibers in a web or mat which are randomly mechanically interlocked and/or entangled with one another.

"Synthetic fiber" and/or "man-made fiber" refers to chemically produced fiber made from fiber-forming substances including polymers synthesized from chemical compounds and modified or transformed natural polymer. Such fibers may be produced by conventional melt-spinning, solution-spinning and like filament production techniques.

A "natural fiber" is a fiber that obtained from animal, mineral or vegetable origins.

"BET surface area" means the surface area ($m^2$) per unit weight (g) of a solid material calculated generally according to Brunauer-Emmett-Teller (BET) methodology as described more fully in S. Brunauer et al, *J. Am. Chem. Soc.,* 1938, 60, 309 (the entire content of which is expressly incorporated hereinto by reference), except that water vapor at 21° C. was employed. (See also the description of the Test Methods in the Examples below.)

"High BET" means a material having a BET surface area of 90 $m^2/g$ or greater, more preferably a BET surface area of 95 $m^2/g$ or greater, and most preferably a BET surface area of 100 $m^2/g$ or greater.

"Low BET" means a material having a BET surface area of less than 90 $m^2/g$.

A "sub-25 hydrocarbon" is a liquid hydrocarbon having an interfacial tension ($\gamma$) of less than 25 dynes/cm.

DETAILED DESCRIPTION

Accompanying FIG. 1 schematically depicts an exemplary module 10 that embodies the present invention. In this regard, the module 10 is provided with a housing 12 having an inlet 12-1 through which a liquid flow of a fuel and water emulsion can be introduced. The housing 12 also includes outlets 12-2 and 12-3 to allow flows of dewatered (dry) fuel and water, respectively, to be discharged from the housing following separation.

The housing 12 includes an interior space 12-4 for holding a separation media 14. In the embodiment depicted, the separation media 14 is in the form of a generally cylindrical structure comprised of a number of longitudinally oriented pleats. Other structural forms of the separation media 14 are of course possible, for example, spirally wound sheets. The fuel/water emulsion thus enters the core 14-1 of the media 14 and then passes therethrough. As is well known, due to density differences, the coalesced water collects at the bottom of the housing and is discharged therefrom through the outlet 12-3. The dewatered (dry) fuel is in turn discharged through the outlet 12-2.

As is perhaps better shown in accompanying FIG. 2, the separation media 14 is a multilayer structure comprised of at least a fibrous nonwoven coalescence layer 16 positioned upstream of a fibrous nonwoven drop retention layer 18. The coalescence layer 16 and the drop retention layer may be positioned immediately adjacent one another and may if desired be physically laminated or physically connected to one another (e.g., by any suitable technique known in the art such as needle punching, adhesives, air jet entanglement and the like). Alternatively, one or more intermediate layers 20 may optionally be interposed between the upstream coalescence layer 16 and the downstream drop retention layer 18. The various layers 16, 18 and optionally 20 may likewise be physically adjacent one another or may be laminated or otherwise connected to one another by any suitable technique known in the art.

In addition (or alternatively) one or more face layers 22 may be provided upstream of the coalescence layer 16, while one or more backing layers 24 may be provided downstream of the drop retention layer 18. Layers 20, 22 and 24 are selected for various functional attributes and do not necessarily need to be nonwoven structures. Of course, such additional layers 20, 22 and/or 24 must not affect adversely the drop retention functionality of the drop retention layer 18.

The coalescence media layer may be a single layer or a multi-layered structure. A preferred embodiment is a tri-layer structure having an upstream layer, a coalescing layer in an intermediate position, and a downstream drop retention layer. The drop retention layer may be laminated with the coalescing media layer into a single separation media sheet. The upstream layer may be a filter layer or a second layer of the coalescence media. The upstream layer of the media is preferably provided for particle filtration and/or to support the structure and/or to physically protect the drop retention layer 18. Tests indicated the nature of the upstream nonwoven exerted some influence over the coalescing performance of the composite. Results reported here include samples involving five separate upstream support layers. Upstream layers were selected for maximized coalesced drop size and specific filtration needs, such as dirt holding capacity, asphaltene adsorption, and particle removal efficiency.

The coalescence layer 16 of the separation media 14 may be of any suitable type. In this regard, the coalescing layer is selected to coalesce an aqueous discontinuous phase of the fuel and water emulsion on the order of 0.01-500 micrometers into discrete water droplets which have sizes of at least about 1 millimeter up to about 10 millimeters. This coalescence of the aqueous discontinuous phase into discrete water droplets occurs as the emulsion passes through the coalescing layer 16.

The coalescing layer 16 presents high surface area for adsorption of water, creating a longer path length for water than other emulsion components. This difference in path length translates to differing elution times for water and other emulsion components, which results in phase enrichment and water coalescence. Separation of the water out of the emulsion occurs when coalesced aqueous drops gravimetrically settle out of the flow as it exits the downstream side of the media. Settling occurs because water is denser than hydrocarbons. In order to settle effectively in a flowing system, coalesced water drops must often overcome the flow of purified hydrocarbon, which in many cases, is counter to the motion of the drops. As such, the size of the water drops is critical to the success of the coalescence media. Successful separation is favored by larger water drops. One particularly preferred media that may be employed satisfactorily as the coalescing layer 16 is described in the US '864 application cited above.

The drop retention layer 18 is a fibrous nonwoven material that exhibits high BET surface area, that is a BET surface area that is at least 80% of 90 $m^2/g$ or greater, more preferably a BET surface area of 95 $m^2/g$ or greater, and most preferably a BET surface area of 100 $m^2/g$ or greater. The principal function of the drop retention layer is to prevent re-emulsification of the coalesced water droplets obtained by the upstream coalescence layer 16, especially for sub-25 hydrocarbons. Thus, after passing through the drop retention layer 18, the coalesced water droplets will retained their coalesced size of at least 1 mm or greater. In other words, the drop retention layer 18 will prevent size degradation of the coalesced water droplets achieved by the coalescence layer 16.

In this regard, the drop retention layer can be formed of virtually any fiber that possesses or can be modified to possess a high BET surface area. Particularly preferred for use as fibers to form the drop retention layers are natural fibers, such as cellulose or cellulose-based fibers (e.g., fibers of wood or plant origin), cotton fibers, wool fibers, silk fibers, rayon fibers and the like. Synthetic fibers formed of fiber-forming polymeric materials may also be employed such as fibers formed of polyesters, polyamides (e.g., nylon 6, nylon 6,6, nylon 6,12 and the like), polyolefins, polytetrafluoroethylene, and polyvinyl alcohol.

In certain embodiments, the drop retention layer 18 may be a mixture of fibers having a high BET surface area and fibers having a low BET surface area. In such embodiments, it is preferred that the high BET surface area fibers be present in an amount of at least about 59 wt. %, more preferably at least about 65 wt. % of high BET surface area fibers, with the balance being low BET surface area fibers. Thus, the drop retention layer 18 will comprise between about 59 wt. % to 100 wt. %, preferably between about 65 wt. % to 100 wt. %, of high BET surface area fibers. However, it will be understood that such ranges are presently preferred embodiments of the invention since virtually any mixture of high and low BET surface area fibers can be employed satisfactorily provided that the overall nonwoven media exhibits high BET surface area properties.

The drop retention layer 18 may optionally be provided with a binder resin so as to impart increased mechanical strength provided that the resin does not adversely affect the BET surface area of the nonwoven drop retention layer 18. If employed, it is preferred that the binder resin be one that possess a polar chemical group so as to facilitate water adsorption and hence water separation from the emulsion. Suitable binder resins that may be satisfactorily employed in the drop retention layer include, but are not limited to, phenolformaldehyde resins, polycarbonate resins, poly(acrylic acid) resins, poly(methacrylic acid) resins, polyoxide resins, polysulfide resins, polysulfone resins, polyamide resins, polyester resins, polyurethane resins, polyimide resins, poly(vinyl acetate) resins, poly(vinyl alcohol) resins, poly(vinyl chloride) resins, poly(vinyl pyridine) resins, poly(vinyl pyrrolidone) resins, as well as copolymers and combinations or blends thereof.

The drop retention layer may be apertured or patterned (embossed) using techniques well known to those in the art. Alternatively or additionally, the drop retention layer may be treated by other suitable techniques to achieve a form suitable for its intended end use application. By way of the example, the drop retention layer may be corrugated, creped, calendered, printed, micrexed and the like.

The basis weights of the coalescence layer 16 and the drop retention layers are not critical. Thus, the coalescence layer 16 and/or the drop retention layer 18 may have a basis weight of at least about 15 grams per square meter (gsm), more preferably at least about 35 gsm up to about 300 gsm. Some embodiments of the coalescence layer 16 may possess a basis weight of between about 35 up to about 110 gsm.

The optional intermediate layer(s) 20 and facing layers 22, 24 may be any sheet-like material that is chosen for a desired function. For example, the layers 20, 22 and/or 24 may be selected so as to provide particulate filtration (e.g., so as to trap loose fibers and other particulate contaminants present in the liquid emulsion), in addition or alternatively to provide structural support and/or protection of the coalescence layer 16 and/or drop retention layer 18. The layers 20, 22 and/or 24 therefore need not be formed of a fibrous material but could be polymeric or metallic sheets or meshes that fulfill the desired function. Suffice it to say that the skilled person in this art can envision various multilayer structures that possess the desired functional attributes for a given end use application provided that water is capable of being separated from a water and fuel emulsion.

The present invention will be further illustrated by the following non-limiting examples thereof.

EXAMPLES

Test Methods

Adsorption isotherms used for application of BET method were determined through gravimetric measurement of water uptake by each downstream layer using the following procedure.

1. The interior of an inert atmosphere chamber was equilibrated to constant relative humidity through exposure to a saturated salt solution of known relative vapor pressure at a constant temperature of 21° C. A milligram sensitive balance was kept inside the chamber.
2. Samples of downstream layers were introduced to the chamber and weighed daily until no change in weight was observed. This typically took 1-2 weeks. Final weights of the samples were recorded.
3. The saturated salt solution was replaced with a new solution of different known relative humidity, and the equilibration/weighing process repeated.
4. A total of five saturated salt solutions were used and are shown with corresponding chamber relative humidity in the table below.

| Salt Solution | Relative Humidity |
|---|---|
| Lithium Chloride | 0.16 |
| Magnesium Chloride | 0.36 |

-continued

| Salt Solution | Relative Humidity |
|---|---|
| Potassium Carbonate | 0.55 |
| Sodium Bromide | 0.64 |
| Potassium Chloride | 0.88 |

5. At the conclusion of measurements for the fifth salt, downstream layer samples were removed from the chamber and dried in a 175° C. oven for five minutes and weighed.
6. Weight of adsorbed water on each sample at each relative humidity was calculated from the difference of the sample weight within the chamber at each relative humidity and the oven dried sample weight.
7. Steps 1-6 were completed in triplicate for each downstream layer sample.
8. In all cases, data obtained with Potassium Chloride produced a nonlinearity in the BET plot, and was excluded from use in surface area calculations.

Separation Media Testing

Tri-layer composites were tested as separation media for separating water from a liquid emulsion of water and hydrocarbon fuel and comprised an upstream layer (UL), a coalescing layer (CL) and a downstream layer (DL) in that order relative to the flow direction of the emulsion. The media employed as the upstream layer (UL), the coalescing layer (CL) and the downstream layer (DL) in the Examples are identified by the codes in Tables 1, 2 and 3, respectively, below.

TABLE 1

Upstream Layer Codes

| Code | Description |
|---|---|
| UL1 | TRINITEX ® wet laid tri-layer synthetic filtration media (Ahlstrom Corporation) |
| UL2 | Phenolic resin saturated cellulose-glass wet laid, high particle removal efficiency fuel filtration media (Ahlstrom Corporation) |
| UL3 | Hydrophobic phenolic resin saturated cellulose-glass wet laid, high particle removal efficiency fuel filtration/water separation media (Ahlstrom Corporation) |
| UL4 | Phenolic resin saturated cellulose-glass wet laid, asphlatene adsorption filtration media (Ahlstrom Corporation) |
| UL5 | Phenolic resin saturated cellulose-glass wet laid, high capacity, high particle removal efficiency lube filtration media (Ahlstrom Corporation) |

TABLE 2

Coalescing Layer Codes

| Code | Description |
|---|---|
| CL1 | 27.0 wt % B-Glass 0.40 micron diameter; 44.1 wt % Virgin Softwood Kraft fiber; 18.3 wt. % fibrillated Lyocell cellulose fiber; 0.5 wt. % polyamide-epichlorohydrin (PAE) resin; and 0.2 wt. % polyacrylamide, 6% Lubrizol Hycar 26138 modified acrylic polymer, 4% Alum |
| CL2 | 30.0 wt % B-Glass 0.65 micron diameter; 49.0 wt % Virgin Softwood Kraft fiber; 20.3 wt. % fibrillated Lyocell cellulose fiber; 0.5 wt. % polyamide-epichlorohydrin (PAE) resin; and 0.2 wt. % polyacrylamide (Example 2 of US '864 application) |
| CL2P | Same as Sample CL2 except produced on a paper machine instead of laboratory equipment |

TABLE 3

Downstream Layer Codes

| DL Ident. | Product Name | Basis Wt (g/m²) | Aperture Pattern | Furnish Components (%) | | | | | | Resin | | BET Surface Area (m²/g) |
|---|---|---|---|---|---|---|---|---|---|---|---|---|
| | | | | Cellulose | Rayon | Lyocell | PP | PE | Nylon | Type | Amt. (wt %) | |
| BH | Ahlstrom 2P-96 | 116 | none | 100 | — | — | — | — | — | PF | 22.5 | 89 |
| A | Cerex Advanced Fabrics Cerex 23 | 10 | none | — | — | — | — | — | 100 | — | — | 85 |
| E | Fiberweb Reemay 2250 | 17 | none | — | — | — | — | 100 | — | — | — | 3 |
| BC | Ahlstrom FF 34/1900 PBT PB SM | 34 | none | — | — | — | — | 100 | — | — | — | 3 |
| BD | Johns Manville JM 6014011 | 42 | none | — | — | — | — | 100 | — | — | — | 9 |
| BE | Fiberweb Reemay 2016 | 46 | none | — | — | — | — | 100 | — | — | — | 5 |
| BF | Ahlstrom 25613 | 80 | none | — | — | — | — | 100 | — | — | — | 36 |
| BG | Cerex Advanced Fabrics Spectramax 102 | 102 | none | — | — | — | — | — | 100 | — | — | 76 |
| D | Ahlstrom EX-180 | 44 | aperture | — | 100 | — | — | — | — | Acrylic (50%) + PVA (50%) | 16.3 | 167 |
| AQ | Ahlstrom EX-182 | 44 | aperture | — | 100 | — | — | — | — | Acrylic (50%) + PVA (50%) | 12 | 168 |
| AY | Ahlstrom SX-159 | 61 | 24 mesh | — | — | 70 | — | 30 | — | PVA | 1.2 | 114 |
| AZ | Ahlstrom SX-555 | 61 | FT-10 | — | 0-35 | 35-70 | — | 30 | — | PVA | 2.2 | 113 |
| V | Ahlstrom 269 | 68 | 24 mesh | — | 0-35 | 35-70 | — | 30 | — | PVA | 1.5 | 116 |
| C | Ahlstrom 268B | 68 | FT-10 | — | — | 70 | — | 30 | — | PVA | 2.0 | 127 |
| J | Ahlstrom SX-71 | 40 | none | — | 100 | — | — | — | — | — | — | 206 |
| K | Ahlstrom SX-6 | 40 | none | — | — | — | — | 100 | — | — | — | <1 |
| L | Ahlstrom SX-441 | 40 | none | — | — | 50 | — | 50 | — | — | — | 89 |
| M | Ahlstrom SX-712 | 40 | none | — | — | 30 | — | 70 | — | — | — | 51 |
| N | Ahlstrom SX-362 | 40 | none | — | — | 65 | — | 35 | — | — | — | 109 |
| R | Ahlstrom 149075 | 54 | none | — | 70 | — | 30 | — | — | — | — | 136 |
| S | Ahlstrom 200 | 55 | none | — | 25-50 | 25-0 | — | 50 | — | — | — | 85 |
| W | Ahlstrom 11222 | 55 | none | 80 | 20 | — | — | — | — | — | — | 139 |
| Y | Ahlstrom SX-329 | 60 | none | — | 80 | — | — | 20 | — | — | — | 153 |
| AE | Ahlstrom 278 | 78 | none | — | 70 | — | — | 30 | — | — | — | 137 |
| AG | Ahlstrom SX-374 | 80 | none | — | 60 | — | — | 40 | — | — | — | 131 |
| AH | Ahlstrom SX-371 | 80 | none | — | 80 | — | — | 20 | — | — | — | 167 |
| AI | Ahlstrom SX-220 | 80 | none | — | — | — | — | 100 | — | — | — | 4 |
| AJ | Ahlstrom SX-705 | 80 | none | — | — | 70 | — | 30 | — | — | — | 119 |

TABLE 3-continued

Downstream Layer Codes

| DL Ident. | Product Name | Basis Wt (g/m²) | Aperture Pattern | Furnish Components (%) | | | | | | Resin | | BET Surface Area (m²/g) |
|---|---|---|---|---|---|---|---|---|---|---|---|---|
| | | | | Cellulose | Rayon | Lyocell | PP | PE | Nylon | Type | Amt. (wt %) | |
| AK | Ahlstrom 160020 | 81 | none | — | 100 | — | — | — | — | — | — | 204 |
| AL | Ahlstrom SX-55 | 81 | none | — | 100 | — | — | — | — | — | — | 192 |
| AM | Ahlstrom 140300 | 81 | none | — | 70 | — | — | 30 | — | — | — | 133 |
| AN | Ahlstrom SX-602 | 90 | none | — | — | 100 | — | — | — | — | — | 170 |
| AO | Ahlstrom SX-617 | 105 | none | — | — | 70 | — | 30 | — | — | — | 121 |
| AP | Ahlstrom SX-570 | 107 | none | — | — | 100 | — | — | — | — | — | 171 |

Notes:
PP = polypropylene
PE = polyester
PF—phenol-formaldehyde
PVA = polyvinyl acetate The layers employed in the tri-layer composites tested were also selected for one or more functional attributes that are identified by the function codes in Table 4 below:

TABLE 4

| Function Code | Description |
|---|---|
| 1 | Composite Support |
| 2 | Particle Filtration |
| 3 | Water Coalescence |
| 4 | Drop Retention |
| 5 | Coalescence Layer Protection |
| 6 | End Use protection from Fiber Migration |

Samples were tested in a flat sheet fuel-water separator bench test rig that models the Society of Automotive Engineers (SAE) J1488 test. The test rig consisted of an emulsification loop and a test loop. 0.25% (2500 ppm) distilled deionized water was emulsified at 26-30° Celsius into fuel using a Gould's 1MC1E4CO Mechanically Coupled 0.75 kw centrifugal pump (3.18 (i)×2.54 (o)×13.18 (imp.) cm) throttled to a flow rate of 7.6 LPM. The resulting fuel-water emulsion was flowed through the emulsification loop which passed the emulsion through a heat exchanger and a bank of clean-up filters before returning dry fuel back to the sump. In tests run in B40 (40% biodiesel/60% ULSD), fuel was dried to 500-1500 ppm water using a bank of four conventional separator filters run in series.

A slip stream of emulsion was flowed from the emulsification loop into the test loop. In the test loop, emulsion was passed through the flat sheet sample holder at a face velocity of 1.22 cm/min. Outlet from the sample holder was returned to the emulsification loop upstream of the heat exchanger. All upstream emulsion transfer lines were of diameter sufficiently small to exceed SAE J1488 velocity targets. The test was run for 90 or 150 minutes with upstream/downstream and sump samples drawn on alternating 10 minute intervals.

The emulsion used in testing of the examples was Ultra Low Sulfur Diesel (ULSD) Type 2D from BP Products, NA, Naperville, Ill. Biodiesel was methylsoyate obtained from Renewable Energy Group, Ralston, Iowa. The blend used was 40 weight percent biodiesel in ULSD. In keeping with industry nomenclature, the resulting blend is identified as B40. Distilled water, 3.4 umho/cm, was Great Value bottled distilled, sodium free commercially available at Wal-Mart USA.

Emulsion samples were homogenized for at least one minute in a Cole Parmer Ultrasonic Bath Model#08895-04. Water content was measured using a Mettler Toledo Model D39 Karl Fischer titrator, and reported in parts per million (ppm). A metric ruler inside the downstream test chamber was used to measure the size of water drops exiting the media.

Two performance metrics were used to judge the water separation capability of a coalescing media, downstream water concentration and coalesced water drop size. Downstream water concentration is determined from Karl Fischer Titration of fuel samples collected in the accepts flow from the downstream side of the multi-layered media. It measures the quantity of water in the fuel downstream of the coalescing layer in parts per million (ppm), based on mass. Clearly, lower levels of titrated water correspond to better water removal performance. In the case of downstream layer performance, however, downstream water concentration was a less important performance metric. This is the case because downstream layer work was conducted in B40 using an extremely efficient coalescing layer. Water concentrations of 400-600 ppm are typical in B40 blends with this coalescing layer. A downstream nonwoven layer will not dramatically increase the water concentration expected for this coalescing layer. Also, Karl Fischer titrations in biodiesel blends have significant variance. Typically, a downstream layer was considered to have negative impact on downstream water concentration when the titrated concentration rose above 800 ppm. Downstream water concentrations were measured at minutes 10 and 90 of the 90 minute tests reported here.

Success of any coalescing layer is dependent on coalesced water drops gravimetrically falling out of a counter current of fuel on the downstream side of the media. Many coalescing filter elements create high velocity fuel flow on the downstream side of the coalescing element. Coalesced water drops must be large enough to settle out of high velocity flow; otherwise they will be carried into the accepts, and re-entrained in the fuel. This re-entrainment constitutes failure of the media to coalesce water, as water is found in Karl Fischer titrations of downstream fuel samples. As such, media that yield 1.0 mm drops are better coalescing media than those that produce 0.1 mm drops. Further, media that create 3.0 mm drops are better than those that create 1.0 mm drops. Finally, media that create no drops, but yield a stream of water flowing down the face of the media or down the center of the media, are considered to be the best, as no drops are available to be swept up in high speed fuel flow. Drops that are less than 1.0 mm in diameter are called "angels" in jet fuel applications. The presence of such angels on the "dry side" of a jet fuel coalescing element is a sign of element failure.

Coalescence media have also traditionally been found to yield foam on the downstream side. Foam production is detrimental to water separation. The foam consists of fuel-enriched water, and is less dense and more voluminous than water. As a result it resists the compaction and settling needed for successful water removal. Foam fills downstream spaces and eventually is carried easily into the fuel accepts, re-entraining water in the fuel.

A drop size target of 1.0 mm and larger was set for the tri-layer laminate media tested according to the examples. This limit was based on coalesced water drop sizes of 1.0-1.7 mm routinely generated by the coalescing layers used in the examples in the absence of a downstream layer. Persistent appearance of <1.0 mm drops and foam production were considered failure characteristics. Absence of drops and creation of a stream of water down the face of the media was considered a pass characteristic as no drops were available to sweep into the accepts. Water drop size was measured using visual inspection at minutes 10 and 90 of the 90 minute tests employed in the examples.

The testing results appear in Table 5 below.

TABLE 5

| Composite Media Description | | | | Composite Media Performance in Flat Sheet SAE J1488 | | | | | |
| --- | --- | --- | --- | --- | --- | --- | --- | --- | --- |
| Emulsion Flow Direction → | | | | | | | | | |
| UL[1] Function[2] 1, 2 | CL[3] Function 3 | DL[5] Function 1, 4, 5, 6 | Lamination Method[4] | Drop Size (mm) at Test Time | | Water Concentration (ppm) at Test Time | | Water Stream | Drop Retention Layer Result | DL BET Surface Area ($m^2/g$) |
| | | | | 10 minute | 90 minute | 10 minute | 90 minute | | | |
| UL2 | CL2P | none | 1 | NA | 1.0-1.7[7] | 499 | 530 | none, drops only | NA | NA |
| UL2 | CL2P | BH | 1 | 0.1-0.8[8] | 0.1-0.8 | 315 | 381 | none, drops only | - | 89 |
| UL1 | CL1 | A | 1 | 0.1-0.8 | 0.1-0.8 | 484 | 655 | none, drops only | - | 85 |
| UL1 | CL2 | E | 1 | 0.1-0.8 | 0.1-0.8 | 644 | 1053 | none, drops only | - | 3 |
| UL2 | CL2P | BC | 2 | 0.1-0.8 | 0.1-0.8 | 679 | 931 | none, drops only | - | 3 |
| UL2 | CL2P | BD | 2 | 0.1-0.8 | 0.1-0.8 | 739[9] | 880 | none, drops only | - | 9 |
| UL2 | CL2P | BE | 2 | 0.1-0.8 | 0.1-0.8 | 541[9] | 647 | none, drops only | - | 5 |
| UL2 | CL2P | BF | 2 | 0.1-0.8 | 0.1-0.8 | 659 | 1009 | none, drops only | - | 36 |
| UL2 | CL2P | BG | 2 | 0.1-0.8 | 0.1-0.8 | 390 | 445 | none, drops only | - | 76 |
| UL1 | CL1 | D | 1 | NA | 2.0-6.5 | 480 | 527 | yes, with drops | yes | 167 |
| UL1 | CL2P | D | 1 | 2.5-3.0 | 2.5-3.0 | 491 | 527 | none, drops only | yes | 167 |
| UL1 | CL2P | AQ | 1 | NA | 3.5-4.0 | 475 | 550 | yes, with drops | yes | 168 |
| UL2 | CL2P | AQ | 1 | NA | 3.0-4.5 | 514 | 510 | yes, with drops | yes | 168 |
| UL3 | CL2P | AQ | 1 | 2.0-2.5 | 3.5-4.5 | 442 | 537 | yes, with drops | yes | 168 |
| UL2 | CL2P | AQ | 2 | 1.0 | 1.0-3.0 | 391 | 522 | none, drops only | yes | 168 |
| UL2 | CL2P | AY | 2 | 1.2-1.5 | 1.0-1.2 | 177 | 269 | none, drops only | yes | 114 |
| UL2 | CL2P | AZ | 2 | 1.5 | 1.0-1.3 | 184 | 248 | none, drops only | yes | 113 |
| UL2 | CL2P | V | 2 | 1.0 | 1.0-1.2 | 707 | 791 | none, drops only | yes | 116 |
| UL1 | CL1 | C | 1 | NA | 1.5-3.0 | 465 | 528 | none, drops only | yes | 127 |
| UL2 | CL2P | J | 2 | 1.0 | 1.5-2.5 | 287 | 534 | none, drops only | yes | 206 |

TABLE 5-continued

| UL[1] | CL[3] | DL[5] | Lam[4] | Drop size[7] | Drop size | | | | | |
|---|---|---|---|---|---|---|---|---|---|---|
| UL2 | CL2P | K | 2 | 0.1-0.7 | 0.1-0.7 | 423 | 734 | none, drops only | - | <1 |
| UL2 | CL2P | L | 2 | 0.1-1.2 | 0.1-1.2 | 461 | 509 | none, drops only | - | 89 |
| UL2 | CL2P | M | 2 | 0.1-1.0 | 0.1-1.0 | 505 | 578 | none, drops only | - | 51 |
| UL2 | CL2P | N | 2 | 1.0 | 0.8-1.5 | 732 | 794 | none, drops only | yes | 109 |
| UL1 | CL2P | R | 1 | 1.0-1.3 | 1.0-1.5 | 487 | 505 | none, drops only | yes | 136 |
| UL1 | CL2 | S | 1 | NA | 0.1-2.0 | 454 | 515 | none, drops only | - | 85 |
| UL2 | CL2P | S | 2 | 0.5-1.4 | 0.5-1.2 | 230 | 277 | none, drops only | - | 85 |
| UL1 | CL2 | W | 1 | no drops | no drops | 510 | 530 | yes, no drops | yes | 139 |
| UL2 | CL2P | Y | 2 | 1.0 | 1.0-1.2 | 408 | 510 | none, drops only | yes | 153 |
| UL2 | CL2P | AE | 1 | no drops | no drops | 455 | 528 | yes, no drops | yes | 137 |
| UL2 | CL2P | AE | 2 | 3.0 | 3.0-5.5 | 373 | 513 | none, drops only | yes | 137 |
| UL2 | CL2P | AG | 2 | 2.0 | 1.5-2.0 | 390 | 543 | none, drops only | yes | 131 |
| UL2 | CL2P | AH | 2 | 1.0-1.2 | 1.0-1.2 | 424 | 509 | none, drops only | yes | 167 |
| UL2 | CL2P | AI | 2 | 0.1-0.7 | 0.1-0.7 | 386 | 579 | none, drops only | - | 4 |
| UL2 | CL2P | AJ | 2 | 1.5-2.0 | 1.0-2.0 | 396 | 502 | none, drops only | yes | 119 |
| UL1 | CL2P | AK | 1 | no drops | no drops | 509 | 537 | yes, no drops | yes | 204 |
| UL2 | CL2P | AK | 2 | no drops | no drops | 369 | 515 | yes, no drops | yes | 204 |
| UL4 | CL2P | AK | 2 | no drops | no drops | 440 | 510 | yes, no drops | yes | 204 |
| UL5 | CL2P | AK | 2 | no drops | no drops | 443 | 517 | yes, no drops | yes | 204 |
| UL2 | CL2P | AL | 2 | no drops | no drops | 465 | 529 | yes, no drops | yes | 192 |
| UL2 | CL2P | AM | 2 | 1.0-2.0 | 2.0-2.5 | 419 | 511 | none, drops only | yes | 133 |
| UL2 | CL2P | AN | 2 | 2.0 | no drops | 396 | 503 | yes, no drops | yes | 170 |
| UL2 | CL2P | AO | 2 | 1.5-2.0 | 1.0-2.5 | 473 | 534 | yes, with drops | yes | 121 |
| UL2 | CL2P | AP | 2 | no drops | no drops | 383 | 557 | yes, no drops | yes | 171 |

[1]Upstream Layer codes defined in Table 1
[2]Layer Function Codes defined in Table 4
[3]Coalescing Layer codes defined in Table 2
[4]Lamination Methods: 1= Layers pressed together with web adhesive on 20° C. hot plate; 2= layers and web adhesive tensioned over a curved surface with 5.0 kg weight in 205° C. oven
[5]Downstream Layer media codes defined in Table 3
[7] Drop size was measured at minute 60, no data available for minute 90
[8]Test performed in 20% biodiesel (B20), a less severe fuel blend as compared to B40
[9]Titration performed at minute 30, no data available for minute 10

As the data in Table 5 shows, those media in the downstream layer (DL) having a high BET surface area exhibited drop retention layer performance characteristics. Specifically, the DL media having a BET surface area of at least 90 m$^2$/g or greater were sufficient to retain the 1 mm or greater size of the water droplets coalesced by the coalescing layer (CL).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. Separation media for separating water from a water and hydrocarbon emulsion comprising:
 a fibrous nonwoven coalescence layer for receiving the water and hydrocarbon emulsion, the coalescence layer being formed of a mixture comprised of glass staple fibers and fibrillated cellulose fibers in an amount sufficient to coalesce the water present in the emulsion to achieve coalesced water droplets having a size of 1 mm or greater as a discontinuous phase within a continuous hydrocarbon phase; and
 a fibrous nonwoven drop retention layer downstream of the coalescence layer having at least 65 wt. % of natural fibers selected from the group consisting of cellulosic fibers, cotton fibers, wool fibers, silk fibers and rayon fibers, wherein
 the fibrous drop retention layer exhibits a high BET surface area as measured by water vapor adsorption of at least 90 $m^2/g$ or greater sufficient to retain the size of the coalesced water droplets to allow separation thereof from the hydrocarbon.

2. The separation media of claim 1, wherein the drop retention layer has a high BET surface area of at least 95 $m^2/g$ or greater.

3. The separation media of claim 1, wherein the drop retention layer has a high BET surface area of at least 100 $m^2/g$ or greater.

4. The separation media of claim 1, wherein the drop retention layer comprises a mixture of fibers having a high BET surface area and fibers having a low BET surface area.

5. The separation media of claim 1, wherein the drop retention layer comprises a resin binder.

6. The separation media of claim 1, wherein the resin binder includes a polar chemical group.

7. The separation media of claim 1, which further comprises at least one additional layer adjacent to one of the coalescence and drop retention layers.

8. The separation media of claim 7, wherein the at least one additional layer is positioned between the coalescence and drop retention layers.

9. The separation media of claim 7, wherein the at least one additional layer is positioned upstream of the coalescence layer.

10. The separation media of claim 7, wherein the at least one additional layer is positioned downstream of the drop retention layer.

* * * * *